(12) United States Patent  
Simmonds et al.

(10) Patent No.: US 9,329,325 B2  
(45) Date of Patent: May 3, 2016

(54) OPTICAL WAVEGUIDES

(75) Inventors: Michael David Simmonds, Kent (GB); Mohmed Salim Valera, Kent (GB)

(73) Assignee: BAE SYSTEMS plc, London (GB)

( * ) Notice: Subject to any disclaimer, the term of this patent is extended or adjusted under 35 U.S.C. 154(b) by 406 days.

(21) Appl. No.: 13/265,487

(22) PCT Filed: Apr. 19, 2010

(86) PCT No.: PCT/GB2010/050639  
§ 371 (c)(1),  
(2), (4) Date: Oct. 20, 2011

(87) PCT Pub. No.: WO2010/122329  
PCT Pub. Date: Oct. 28, 2010

(65) Prior Publication Data  
US 2012/0044572 A1    Feb. 23, 2012

(30) Foreign Application Priority Data  
Apr. 20, 2009    (EP) .................................... 09275026  
Apr. 20, 2009    (GB) .................................... 0906707

(51) Int. Cl.  
*F21V 8/00*    (2006.01)  
*G02B 27/01*    (2006.01)

(52) U.S. Cl.  
CPC ............ *G02B 6/0038* (2013.01); *G02B 6/0061* (2013.01); *G02B 27/0101* (2013.01); *G02B 27/0172* (2013.01)

(58) Field of Classification Search  
CPC .. G02B 6/00; G02B 27/0101; G02B 27/0038; G02B 27/0061; G02B 6/0061; G02B 27/0172

USPC ............................................. 385/37; 359/462  
See application file for complete search history.

(56) References Cited

U.S. PATENT DOCUMENTS 4,165,920 A * 8/1979 Brown ......................... 359/613  
4,330,175 A * 5/1982 Fujii et al. ..................... 359/571  
(Continued)

FOREIGN PATENT DOCUMENTS

DE    271960 A  *  9/1989  
EP    0 704 655 A1    4/1996  
(Continued)

OTHER PUBLICATIONS

Perry, Michael, Multilayer Dielectric Gratings: Increasing the Power of Light, Science & Technology Review, p. 25, 1995, available at https://str.llnl.gov/str/pdfs/09_95.2.pdf.*

(Continued)

*Primary Examiner* — Peter Radkowski  
(74) *Attorney, Agent, or Firm* — Scully, Scott, Murphy & Presser, PC (57) ABSTRACT

An optical waveguide comprising a body of material configured for the contained propagation of light therethrough, a surface relief grating configured to receive the propagating light and at least partially to diffract or reflect it out of the waveguide, and at least one layer of dielectric material of varying thickness having a first surface and a second surface which conforms to a profiled surface of the grating so that the grating exhibits a spatial variation in efficiency dependent on the varying thickness of the dielectric material.

15 Claims, 6 Drawing Sheets

(56) References Cited

U.S. PATENT DOCUMENTS

| | | | |
|---|---|---|---|
| 4,469,402 A * | 9/1984 | Yata et al. | 359/457 |
| 4,711,512 A * | 12/1987 | Upatnieks | 345/7 |
| 4,911,516 A | 3/1990 | Palfrey | |
| 4,946,245 A * | 8/1990 | Chamberlin et al. | 385/37 |
| 5,138,687 A * | 8/1992 | Horie et al. | 385/129 |
| 5,224,198 A * | 6/1993 | Jachimowicz et al. | 385/133 |
| 5,703,667 A | 12/1997 | Ochiai | |
| 5,907,436 A * | 5/1999 | Perry et al. | 359/576 |
| 6,169,613 B1 * | 1/2001 | Amitai et al. | 359/15 |
| 6,222,974 B1 | 4/2001 | Nagata | |
| 6,480,332 B1 * | 11/2002 | Nakai | 359/566 |
| 6,580,529 B1 * | 6/2003 | Amitai et al. | 359/13 |
| 6,728,034 B1 * | 4/2004 | Nakanishi et al. | 359/566 |
| 6,757,105 B2 * | 6/2004 | Niv et al. | 359/569 |
| 6,822,796 B2 * | 11/2004 | Takada et al. | 359/569 |
| 6,829,095 B2 * | 12/2004 | Amitai | 359/630 |
| 7,006,733 B2 * | 2/2006 | Galstian et al. | 385/37 |
| 7,021,777 B2 * | 4/2006 | Amitai | 359/857 |
| 7,181,108 B2 * | 2/2007 | Levola | 385/37 |
| 7,206,107 B2 * | 4/2007 | Levola | 359/34 |
| 7,391,573 B2 * | 6/2008 | Amitai | 359/630 |
| 7,492,512 B2 * | 2/2009 | Niv et al. | 359/407 |
| 7,573,640 B2 * | 8/2009 | Nivon et al. | 359/630 |
| 7,653,268 B1 * | 1/2010 | DeJong | 385/11 |
| 8,160,411 B2 * | 4/2012 | Levola et al. | 385/37 |
| 2002/0044359 A1 * | 4/2002 | Shimmo et al. | 359/572 |
| 2002/0063962 A1 * | 5/2002 | Takada et al. | 359/569 |
| 2002/0122015 A1 * | 9/2002 | Song et al. | 345/8 |
| 2002/0131275 A1 | 9/2002 | Yamamoto et al. | |
| 2002/0141065 A1 * | 10/2002 | Cowan et al. | 359/599 |
| 2003/0039442 A1 | 2/2003 | Bond et al. | |
| 2003/0202247 A1 * | 10/2003 | Niv et al. | 359/569 |
| 2004/0021946 A1 * | 2/2004 | Hoose et al. | 359/571 |
| 2005/0213348 A1 * | 9/2005 | Parikka et al. | 362/619 |
| 2006/0018014 A1 * | 1/2006 | Niv et al. | 359/407 |
| 2006/0126179 A1 * | 6/2006 | Levola | 359/563 |
| 2006/0132914 A1 * | 6/2006 | Weiss et al. | 359/462 |
| 2006/0221448 A1 * | 10/2006 | Nivon et al. | 359/572 |
| 2006/0228073 A1 * | 10/2006 | Mukawa et al. | 385/31 |
| 2007/0008624 A1 * | 1/2007 | Hirayama | 359/630 |
| 2007/0230534 A1 * | 10/2007 | Erlandson et al. | 372/102 |
| 2010/0177388 A1 * | 7/2010 | Cohen et al. | 359/566 |
| 2010/0321781 A1 * | 12/2010 | Levola et al. | 359/569 |

FOREIGN PATENT DOCUMENTS

| | | |
|---|---|---|
| EP | 1 734 401 A1 | 12/2006 |
| WO | WO 2007/029034 A1 | 3/2007 |
| WO | WO 2007/129783 A1 | 11/2007 |

OTHER PUBLICATIONS

International Search Report dated Jul. 13, 2010 issued in PCT/GB2010/050639.
European Search Report dated Sep. 30, 2009 issued in 09275026.
UK Search Report dated Mar. 10, 2010 issued in GB0906707.5.

* cited by examiner

OPTICAL WAVEGUIDES

This invention relates to optical waveguides, particularly but not exclusively for use in waveguide-based imaging systems, such as for example head-up displays, head-mounted displays, helmet mounted displays and other projection displays.

Our earlier specification WO2007/029034 describes a waveguide-based imaging system, and the disclosure of that specification is included herein by reference.

We have found that systems embodying the invention of '034 can benefit from the use of an image (light) injection grating having high angular bandwidth and high reflective efficiency. One aspect of the present invention can in its preferred embodiments provide a waveguide having such an injection grating.

Thus in that aspect the invention provides an optical waveguide comprising a body of material configured for the contained propagation of light therethrough, a surface relief grating configured to receive the propagating light and at least partially to diffract or reflect it out of the waveguide, and at least one layer of dielectric material of varying thickness having a first surface and a second surface which conforms to a profiled surface of the grating so that the grating exhibits a spatial variation in efficiency dependent on the varying thickness of the dielectric material.

This aspect of the invention also provides the use, for the purpose of controlling the efficiency and/or angular bandwidth of a reflecting surface relief grating of an optical waveguide, of at least one layer of dielectric material conforming to a reflecting profiled surface of the grating, the waveguide being operable such that light passes through the dielectric material to the reflecting profiled surface. The term layer or coating as used herein in connection with the dielectric material means a layer of coating having a thickness substantially less than the wavelength of the visible light, for which it is to be used, for example in the range 5 to 250 µm, and preferably 15 to 70 µm.

The at least one layer of dielectric material may comprise one or more of silicon dioxide, aluminium oxide or titanium dioxide. Preferably it is titanium dioxide. The thickness of the at least one dielectric layer may be selected to control the efficiency and/or angular bandwidth of the grating.

The waveguide may comprise a profiled waveguide surface, the at least one dielectric layer being disposed on the profiled waveguide surface so as to reproduce the profile thereof, the profiled reflective surface of the grating being a surface of a layer of material disposed on the at least one dielectric layer and conforming thereto.

In an alternative embodiment, the profiled reflecting surface may be a reflective surface of a substrate which is conformably coated with the at least one dielectric layer and is optically contacted to a surface of the waveguide.

The reflective surface may be a surface of a metallic or other material having a complex refractive index.

We have found that alternatively or in addition to being used for injecting light into the rod-like wave guide of '034, or other waveguides, a dielectric layer conforming to the profiled surface of a surface relief grating may also be used to advantage in the extraction of light from a waveguide. For example it may be used in the invention of '034 in the extraction of light from a rod-like waveguide for supply to a plate waveguide and/or in the plate waveguide itself. In each case the dielectric layer can be used to control the efficiency of the grating.

This aspect of the invention thus provides an optical waveguide comprising a body of material configured for the contained propagation of light therethrough, a surface relief grating within configured to receive the propagating light and at least partially to diffract or reflect it out of the waveguide, and at least one conforming layer of dielectric material of varying thickness on a profiled surface of the grating so that the grating exhibits a spatial variation in efficiency.

This aspect of the invention also provides the use for the purpose of controlling the efficiency of a surface relief grating of an optical waveguide of at least one layer of dielectric material conforming to a profiled surface of the grating. By "efficiency" we mean reflective or transmissive efficiency, depending on whether the grating is a reflection or transmission grating.

In these aspects the grating preferably is a low-efficiency grating of high bandwidth, having a relatively low efficiency at the diffraction or reflection order of interest, the majority of the incident light remaining undiffracted in the zeroth order so as to continue to propagate within the waveguide.

The grating may extend longitudinally of the waveguide, the efficiency of the grating varying longitudinally of the waveguide.

This can enable the efficiency of the grating to be increased along the length of the waveguide, to compensate for the increasing attenuation of the transmitted light with distance along the waveguide.

The variation of efficiency of the grating may be such that for uniform input light to the waveguide the intensity of the light passing out of the waveguide is substantially constant along the grating in the direction of propagation.

As noted, the invention may be applied to plate waveguides as well as those of elongate form. Such a plate waveguide may be used in conjunction with a waveguide as set forth above. The spatial efficiency of the grating of the plate waveguide may be such that for light of uniform intensity injected into the first-mentioned waveguide, an image formed by the plate waveguide is of substantially uniform intensity.

The surface relief grating of the plate waveguide may extend longitudinally and transversely of the direction of propagation, the thickness of the at least one layer varying in both the longitudinal and transverse directions. Thus the thickness of the at least one layer may increase in both the longitudinal and transverse directions so that the efficiency of the grating increases from one corner thereof to an opposite corner. Thereby the plate waveguide may be used to compensate for the attenuation suffered by light diffracted out of a conventional rod-like waveguide at different points along its length. Specifically the plate waveguide may be used in combination with a further waveguide arranged to inject light into the plate at locations distributed along a transverse extent thereof, the variations in thickness of the at least one layer being such that the consequent spatial variation of the efficiency of the plate waveguide grating compensates for variations in the intensity of the light injected by the further waveguide.

The exit gratings of known waveguides are surface relief structures on the surface of the waveguide. We have found that as such a structure is vulnerable to the external environment, and needs a further cover piece (which does not optically contact the waveguide) to protect it. This can be inconvenient when integrating the waveguide into the design of other apparatus, and can add to the cost of the product.

Thus the grating preferably is embedded within the material of the waveguide.

The grating may be disposed at an interface between two portions of the waveguide body material.

In particular, it may be disposed on a surface of a said portion at said interface.

The waveguide may comprise two external surfaces disposed parallel to the direction of propagation so as in operation to contain the propagating light, the grating extending parallel to the external surfaces.

The waveguide may comprise a beam splitter for directing propagating light towards both of said external surfaces.

Preferably, the position of the beam splitter transversely of the propagation direction relative to the external surface is selected so as to optimise the uniformity of a display formed by light diffracted or reflected out of the waveguide. The independent aspects of the invention set out above can be used singly or in any combination. Furthermore, the optional or preferred features set out above may be utilised in any operative combination with any aspect of the invention. In particular (but without limitation) a feature hereafter appearing in a subordinate claim dependent from an independent claim to one aspect of the invention may be incorporated in a claim to another aspect of the invention. All subordinate claims are deemed repeated in this introduction to the specification as consistory clauses, to the extent that they do not already appear above.

The invention will be described, by way of example only, with reference to the accompanying drawings, wherein.

Figure 1:
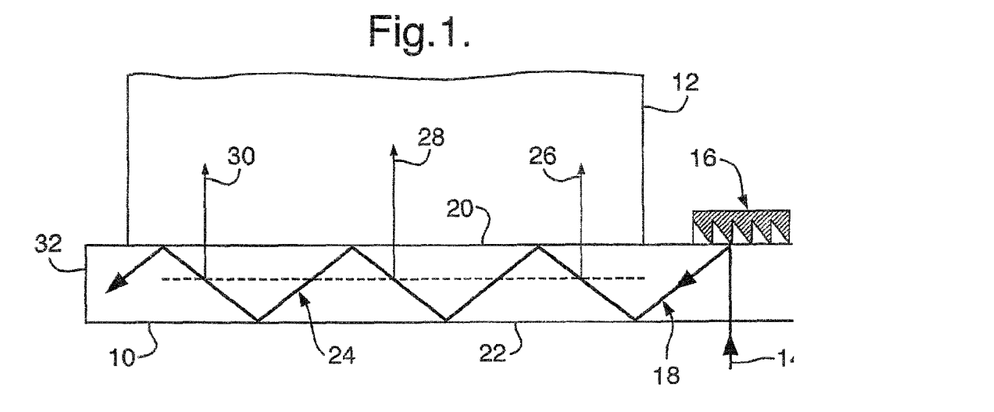
FIG. 1 shows a waveguide according to the invention.

Referring to FIG. 1, a projection display suitable for use in a head-up display comprises a rod-like waveguide 10 of glass or transparent plastics material. The waveguide 10 is of square or rectangular cross-section and is placed in close proximity to a plate waveguide 12 in which in operation the display is formed as explained in our '034 specification. Collimated image bearing light 14 exits collimation optics (not shown), and is incident on an input reflection grating 16 which is disposed on a rear surface 20 of the waveguide 10. The collimated light has rays at range of angles relative to the collimation axis which determines the field of view of the system. The reflection grating diffracts the incident rays at angles such that all of them are totally internally reflected when incident on the four surfaces of the waveguide 10; two of the surfaces 20 and 22 are shown in FIG. 1. The rays (a typical one of which is shown at 18) thus are contained within the waveguide 10 between its parallel opposite surfaces, and propagate down the length of the waveguide 10.

The propagating rays are incident repeatedly on a low efficiency grating 24, each time a proportion 26, 28, 30 of the incident light being diffracted out of the waveguide 10 into the plate waveguide 12 at an angle which is generally perpendicular to the axis of the waveguide 32 shown by the broken line. The remainder of the light passes through the grating and ultimately is absorbed at the end 32 of the waveguide 10. The end 32 of the waveguide 10 is coated or painted with a suitably absorbtive material. The distributed partial diffraction of the light into the plate waveguide 12 results in expansion of the image in the plate waveguide across its width parallel to the extent of the waveguide 10.

Figure 2A:
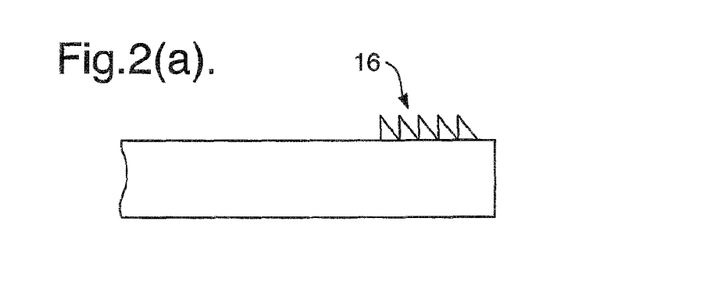
FIG. 2 shows part of the structure of FIG. 1.
Figure 2B:
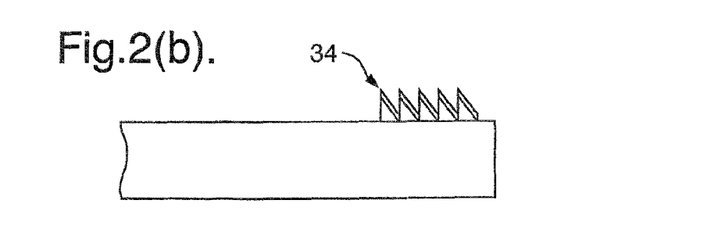
Figure 2C:
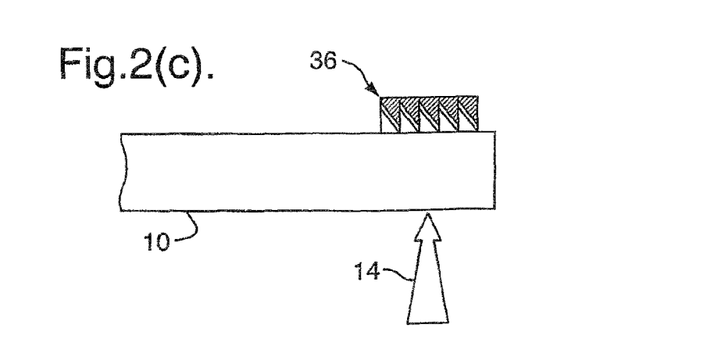

FIG. 2 shows the input grating 16 in more detail. The grating (here shown enlarged for clarity in FIG. 2(a)) is etched onto the surface 20 of the waveguide 10, or is replicated on to it using a UV-curable polymer. Here the grating is a periodic sawtooth profile. One or more layers 34 of dielectric material (FIG. 2(b)) are applied conformably to the surface of the grating. That is, as shown, both a first (lower) surface of the dielectric layer 34 and a second (upper) surface of the dielectric layer conform to a profile of the grating, which in this case is a sawtooth profile. The first surface is proximate the grating and the second surface is distal from the grating. A conforming metallic reflecting layer 36 (FIG. 2 (c)) is applied to the rear surface of the dielectric layer 34. The metallic reflecting layer 36 may be silver, gold, aluminium or another material having a complex refractive index. Preferably it is silver.

Figure 3A:
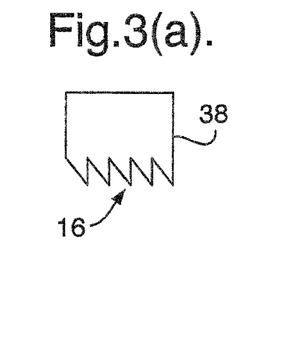
FIG. 3 shows an alternative form of the structure of FIG. 2.
Figure 3B:
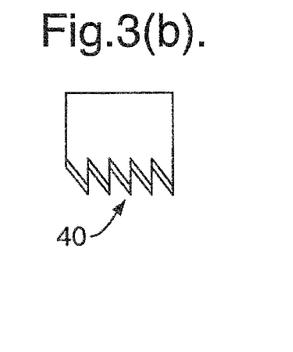
Figure 3C:
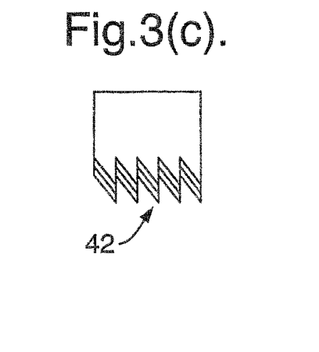

FIG. 3 shows an alternative form of the injection grating 16. The grating is either etched or replicated onto a substrate 38 using a UV-curable polymer (FIG. 3(a)). A conformal metallic layer 40 of constant thickness is applied to the grating, and is overlaid by one or more layers 42 of dielectric material. The material of the layers 40, 42 and their thicknesses are chosen according to the same criteria as for the FIG. 2 embodiment. The grating 16 is then glued to the surface 20 of the waveguide 10 by means of optical cement. It is not essential that the cement has exactly the same refractive index as the material of the waveguide 10. For example, for waveguide material of n≈1.5, cement having 1.5≤n≤1.6 would be suitable.

A specific example will now be described to demonstrate the improvement which can be obtained in angular bandwidth and efficiency with the use of a grating according to this aspect of the invention. Although the example uses the rod-like waveguide 10, the invention is of course applicable to other waveguides to or from which light is to be injected or extracted.

Figure 4A:
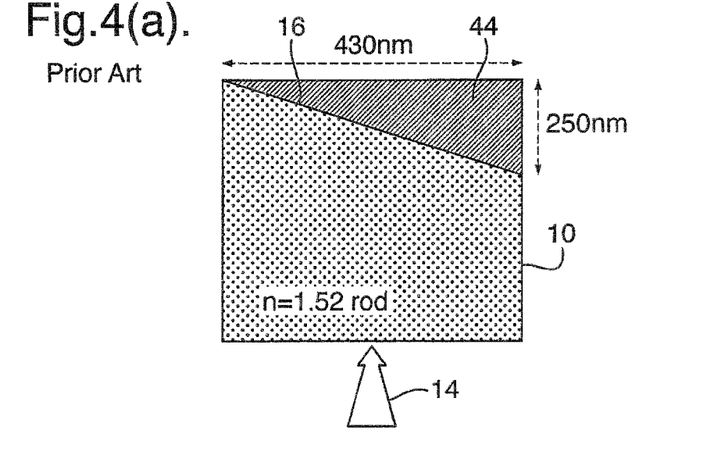
FIG. 4(a) shows a prior art structure.
Figure 5:
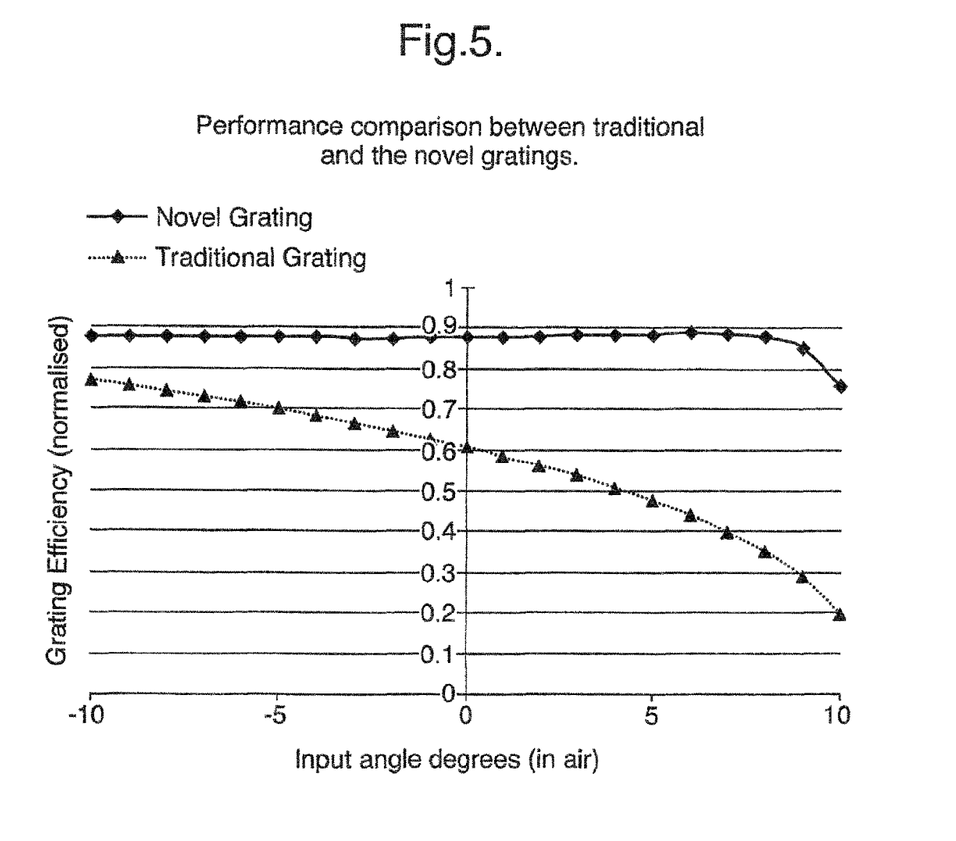
FIG. 5 shows the relative performance of the structures of FIGS. 4(a) and 4(b)
Figure 6A:
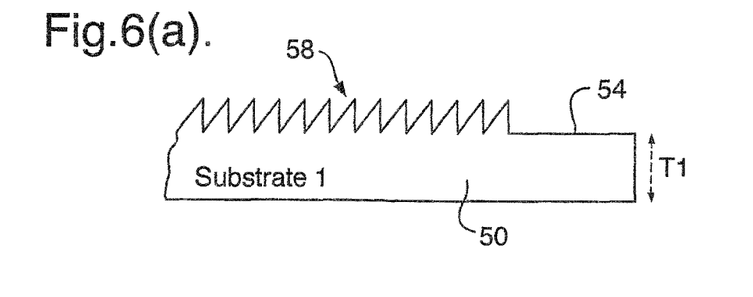
FIG. 6 shows a further part of the structure of FIG. 1.
Figure 6B:
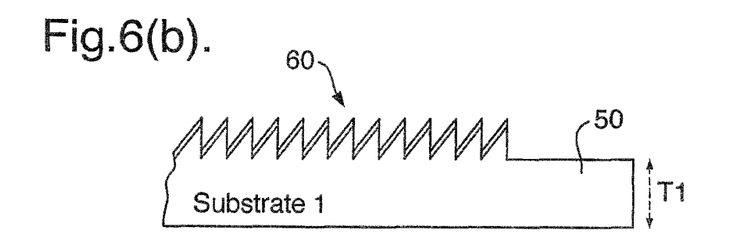
Figure 6C:
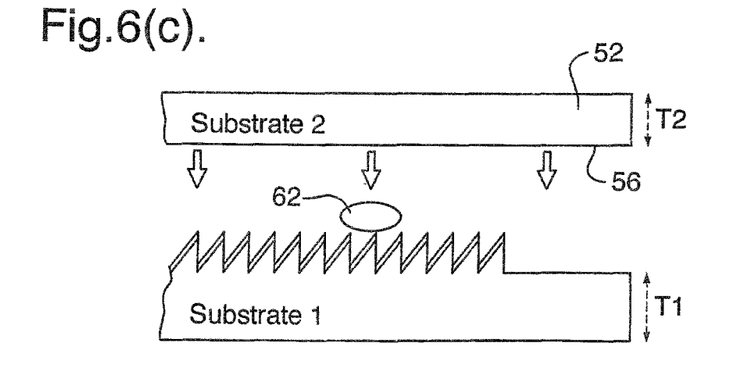
Figure 6D:
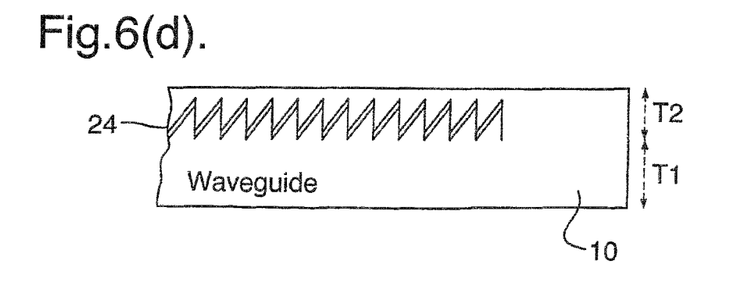

A collimated-image bearing beam 14 with a 20° field of view (angular bandwidth) is required to be injected from air into the waveguide 10, which is of material having a refractive index n=1.52. A sawtooth type grating 16 with period 430 nm and height 250 nm is etched or replicated onto the surface 20 of the waveguide 10. Conventionally, a thick layer (approximately 100 nm) of silver 44 would be coated onto the surface of the grating, as shown in FIG. 4(a). FIG. 5 shows the reflective efficiency of this conventional grating in the +1 diffraction order (dashed line) for input ray angles ranging from −10° to +10° relative to the collimation axis, for light of wavelength 532 nm.

Figure 4B:
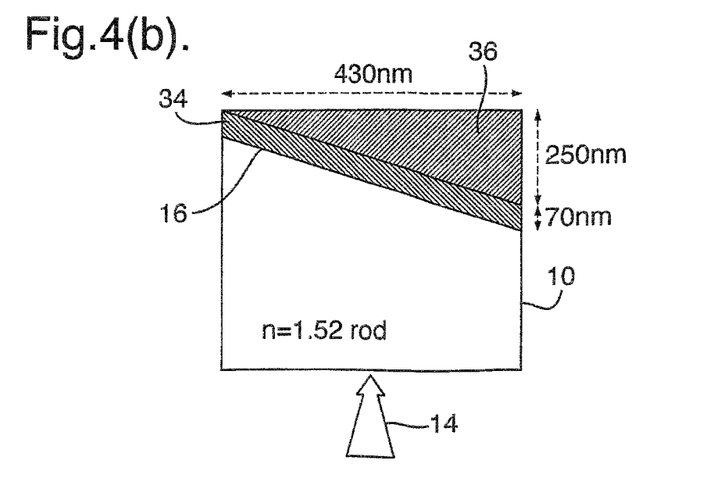
FIG. 4(b) shows an enlarged view of part of the structure of FIG. 2.

In a grating according to the invention (FIG. 4(b)) a conformal layer 34 of titanium dioxide approximately 70 nm thick is first applied to the grating 16. A layer 36 of silver approximately 100 nm thick is then overlaid onto the layer 34. The efficiency of this grating under the same conditions as for the grating of FIG. 4(a) also is shown in FIG. 5 (solid line). It is evident that the efficiency and the bandwidth of the grating is substantially improved compared to that of FIG. 4(a). More specifically, an efficiency of 7% is generated for a TiO2 coating thickness of 15 nm, and an efficiency of 24% is generated for a TiO2 coating thickness of 70 nm.

FIG. 6 shows the embedded exit grating 24 in more detail. The waveguide 10 comprises lower and upper substrates 50, 52, of respective thickness T1 and T2, and having abutting surfaces 54, 56. The lower substrate 50 has on its upper surface 54 a surface relief grating 58 (here of a sawtooth profile, shown much enlarged in FIG. 6(a)), produced by etching or replicating as already described for grating 16. A conformal dielectric coating or layer 60 (FIG. 6(*b*)) is applied to the grating in a thickness which increases in the direction of propagation of the light along the waveguide 10 (right to left in FIG. 6). The substrate 52 is laid onto the lower substrate 50 and cemented thereto by optical cement 62 (FIG. 6(*c*)) along its whole length so as to be optically continuous therewith. The choice of the refractive index of the cement will depend on the range of angles in the propagating light rays within the waveguide, the refractive index of the substrates 50, 52 the refractive index of the replication material and the refractive indices of the range of available optical cements with suitable optical properties. These choices are made when the waveguide based display is being designed. In the example described here, with substrates 50, 52 having a refractive index n≈1.5, it is normally sufficient to use optical cement having n between about 1.5 and 1.6.

The thickness of the coating is chosen to increase the efficiency of the grating along the waveguide to compensate for the progressive attenuation of the light as it is propagated along the waveguide. Ideally the increase in thickness of the layer 60 is such as fully to compensate for the attenuation, so that the intensity of the light diffracted transversely out of the waveguide from longitudinally separated points along the grating is equal. In practice, the increase in thickness of the layer 60 is such as to compensate for the attenuation within acceptable limits, so that the intensity of the light diffracted transversely out of the waveguide from longitudinally separated points along the grating is approximately equal.

Figure 7:
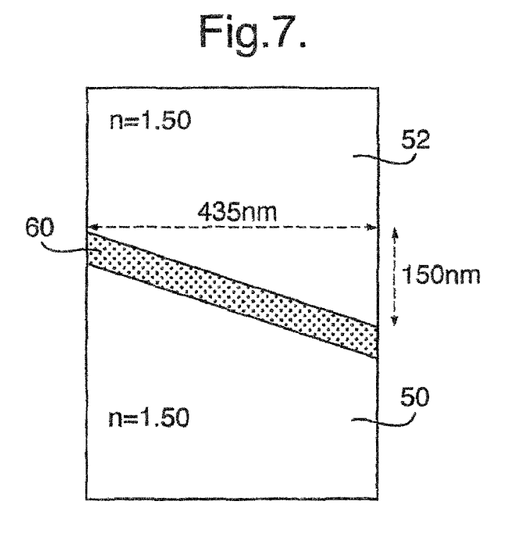
FIG. 7 shows an enlarged view of part of the structure of FIG. 6.

FIG. 7 shows one tooth of the sawtooth grating 24. The grating has a period of 435 nm and a height of 150 nm. In one prototype, the titanium dioxide layer 60 was made 20 nm thick. In another, it was made 40 nm thick. In each prototype the substrates 50, 52 and the optical cement 62 had a refractive index n of approximately 1.5.

Figure 8:
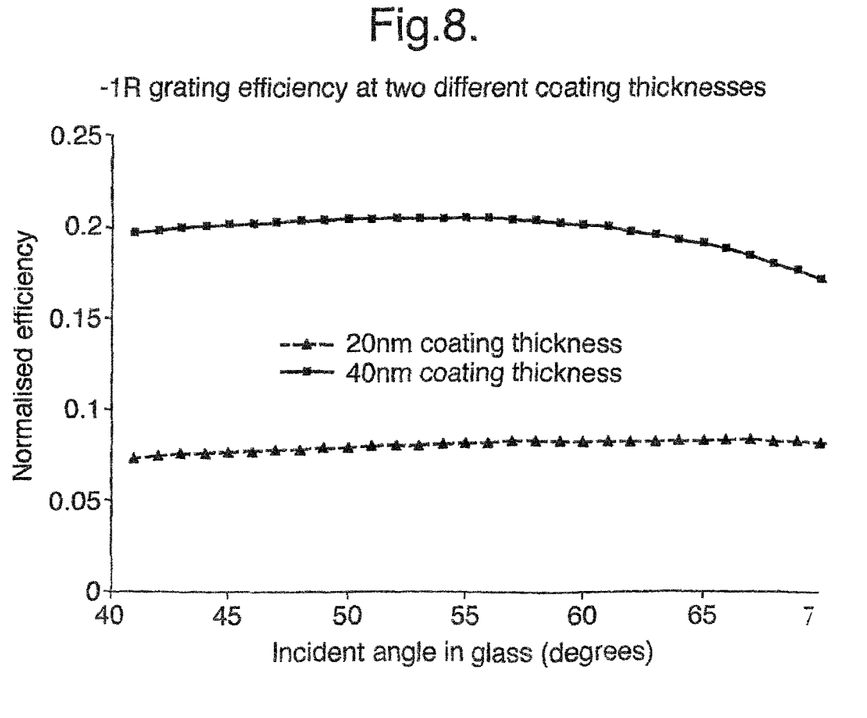
FIG. 8 shows the performance of two versions of the structure of FIG. 6.

FIG. 8 shows the performance of the two prototypes with incident rays of wavelength 532 nm propagating within the waveguide 10. The lower line in the graph shows the performance of the grating with the 20 nm titanium dioxide coating, and the upper line the performance of the grating with the 40 nm coating. In both cases the rays are incident on the waveguide at from 40° to 72°. The average efficiency of the grating with the 20 nm coating is approximately 7.5%, for the other grating the efficiency is about 20% for angles of incidence between 40° and 62°, and falls away slightly above that range. The average however is about 19% for angle of incidence between 40° and 72°. Hence by increasing the thickness of the dielectric layer 60 along the length of the waveguide, the intensity of the diffracted output rays 26, 28, 30 can be equalised, and a more even brightness can be obtained in the display in the plate waveguide 12. Another advantage which may be obtained is the more efficient utilisation of light, and hence a reduction in total intensity of the collimated light input 14 required to achieve a given brightness in the display in the waveguide 12.

The graduated thickness of the layer 60 can be achieved by interposing a suitably shaped mask between the substrate 50 as the source in the coating chamber used to deposit the titanium dioxide material. Alternatively a moveable baffle may be used; moving it continuously at a controlled speed can enable the coating thickness on the grating to be varied in a controlled manner.

Figure 9:
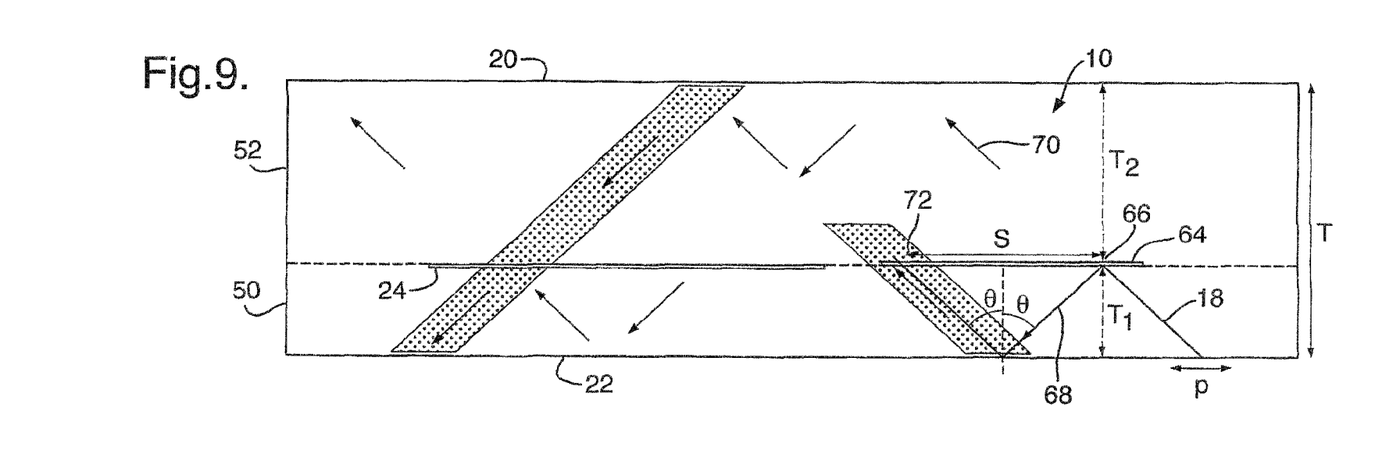
FIG. 9 shows part of the embodiment of FIG. 1 in greater detail.

Although not shown in FIG. 1 for simplicity, the waveguide 10 contains one or more beam-splitters 64, FIG. 9 which are coplanar with the grating 24 and on which the beam 18 is incident before it arrives at the grating. The beam-splitters 64 are one or more semi-reflecting surfaces disposed substantially parallel to the waveguide surfaces 20, 22. We have found that the relative dimensions $T_1$, $T_2$ (the thickness of the two substrates 50, 52 where $T_1 + T_2 = T$, the total thickness of the waveguide) can be chosen further to increase the uniformity of the image being diffracted out of the waveguide 10 by the grating 24. By uniformity we mean the lack of variation in the intensity of the output image, assuming that the intensity of the input image is itself uniform.

At each interaction e.g. 66 of any impinging image-bearing beam 18 with a beam splitter, it is divided into two parts 68, 70 one passing undeflected through the beam splitter, the other being reflected.

Considering just the reflected part 68 of the beam, this beam 68 totally internally reflects off the wall 22 of the waveguide and impinges again on the beam splitter at 72 a distance (S) downstream of the previous impingement 66. Assuming that the beam 18 and its sub-parts each have a beam width (pupil) P in the propagation direction, it is necessary for S≤P if there are to be no gaps between adjacent pupils in the image produced by the grating 10.

Thus, with reference to FIG. 9, $$S/2_1 = \tan \theta$$

and S=2 $T_1$ tan θ

Normally P is chosen so that P=2 T.

In the limited case of adjacent pupils just touching, S=P, and for total internal reflection θ=at least 72, assuming n=1.5. Then tan θ=3.08 and 2 T=6.16 T And thus the maximum value of $T_1$ is approximately ⅓ T or ½ $T_2$ Slightly different ratios of $T_1$ to $T_2$ will be obtained for different values of the refractive index n of the waveguide material. It will be appreciated that the dimensions $T_1$ and $T_2$ can be interchanged; indeed in FIG. 6 $T_1$ is shown as the larger of the two dimensions. For convenience in manufacture it is preferable that the beam splitter 64 is coplanar with the grating.

The plate waveguide 12 may also have a surface relief grating according to the invention embedded in it which forms a two dimensional image from the image-bearing beams 26, 28, 30 from the waveguide 10. The grating thus may be of similar construction to that shown in FIG. 6 with a conforming dielectric layer or existing applied to its profiled surface, and increasing in thickness with distance away from the interface of the waveguide 10 and 12. Then the efficiency of the grating increases with distance away from the interface, thereby compensating for the attenuation suffered by the injected beams 26, 28, as they progress through the waveguide 12.

Figure 10:
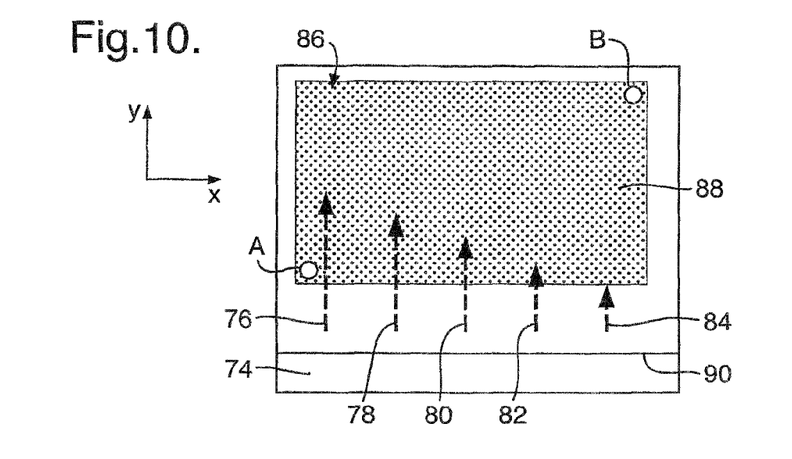
FIG. 10 shows another embodiment of the invention.

FIG. 10 shows a plate waveguide for use with a conventional rod-like waveguide which does not have a variable efficiency grating according to the invention. Beams 76, 78, 80, 82, 84 are diffracted out of a rod-like waveguide 74 by a conventional constant-efficiency grating from an injected beam propagating from left to right in FIG. 10. Because of progressive attenuation down the waveguide 74, the beams 76-84 have relative intensities proportional to the lengths of the illustrated vectors. The beams enter a plate waveguide 86 wherein a two dimensional image is formed by a surface relief grating 88. This grating has a dielectric coating or layer on its profiled surface similar to that described with reference to FIG. 6, except that the coating varies in thickness in two dimensions. Thus, the thickness and the coating efficiency increase in the y direction away from the interface 90 with the waveguide 74 to compensate for attenuation in the waveguide 86; furthermore, the thickness and the grating also increase in the x direction away from the left-hand edge of the waveguide 90 to compensate for the attenuation in the waveguide 74. As a result the grating efficiency increases diagonally across the grating from a minimum at the corner A of the grating, to a maximum at corner B. This can materially assist in overcoming the fault often seen in prior art apparatus of this type where for an evenly-illuminated image injected into the waveguide 74, the resulting display in the plate waveguide 90 is noticeably darker at point B than at point A.

In summary, this specification discloses the use, for the purpose of controlling the reflective or diffractive efficiency and/or angular bandwidth of a surface relief grating of an optical waveguide, of at least one layer or coating of dielectric material conforming to a profiled surface of the grating. The waveguide is operable such that light passes through the dielectric material to the profiled surface. The grating may be a reflection or transmission grating. In a transmission grating, the coating may vary in thickness so as to provide a grating having a spatial variation in efficiency.

The invention claimed is:

1. An optical waveguide comprising a body of material configured for contained propagation of light therethrough, a surface relief grating configured to receive the propagating light and at least partially to diffract or reflect it out of the waveguide, and at least one layer of dielectric material applied to a surface of the surface-relief grating of a thickness that increases along the length of the waveguide in the direction of said propagation so that the grating exhibits a spatial variation in efficiency dependent on the increasing thickness of the dielectric material along the length of the waveguide.

2. The waveguide of claim 1 wherein the grating is embedded within the material of the waveguide, the grating being disposed at an interface between two portions of the waveguide body material, on a surface of one said portion at said interface.

3. The waveguide of claim 2 wherein the grating comprises a profiled surface and the at least one layer of dielectric material has a first surface and a second surface which substantially conforms to the profiled surface of the grating.

4. The waveguide of claim 3 comprising two external surfaces disposed parallel to the direction of propagation so as in operation to contain the propagating light, the grating extending parallel to the external surfaces, and a beam splitter for directing propagating light towards both of said external surfaces.

5. The waveguide of claim 4 wherein the grating is configured to receive propagating light at a plurality of locations along the waveguide in the direction of propagation, the position of the beam splitter transversely of the propagation direction relative to the external surfaces being selected so as to optimise the uniformity of a display of an image formed by light diffracted or reflected out of the waveguide.

6. The waveguide of claim 1 wherein the thickness of the at least one layer of dielectric material increases such that for uniform input light input into the waveguide the intensity of outgoing light is substantially constant along the length of the grating in the direction of propagation.

7. The waveguide of claim 1 in combination with a plate waveguide into which the light leaving the waveguide is directed to form a display.

8. The waveguide of claim 7 wherein the plate waveguide comprises a body of material configured for contained propagation of light therethrough, a surface relief grating configured to receive the propagating light and at least partially to diffract or reflect it out of the waveguide, and at least one layer of dielectric material applied to a surface of the surface-relief grating of a thickness that increases along the length of the plate waveguide in the direction of said propagation so that the grating exhibits a spatial variation in efficiency dependent on the increasing thickness of the dielectric material along the length of the plate waveguide.

9. The waveguide as in claim 8 wherein the efficiency of the plate waveguide surface relief grating increases along its length in the direction of propagation whereby for light of uniform intensity injected into the plate waveguide, an image formed by the plate waveguide is of substantially uniform intensity along the length of the plate waveguide.

10. The waveguide of claim 1 wherein the surface relief grating of the plate waveguide extends longitudinally and transversely of the direction of propagation, the thickness of the at least one layer of dielectric material increasing in both the longitudinal and transverse directions.

11. The waveguide of claim 10 wherein the thickness of the at least one layer of dielectric material increases in both the longitudinal and transverse directions so that the efficiency of the plate waveguide increases from one corner thereof to an opposite corner.

12. The waveguide of claim 10 further including an injection waveguide arranged to inject light into the plate waveguide at locations distributed along a transverse extent thereof, the variations in thickness of the at least one layer of dielectric material, being such that the consequent spatial variation of the efficiency of the plate waveguide grating compensates for variations in the intensity of the light injected by the injection waveguide.

13. The waveguide of claim 1 wherein the dielectric layer comprises one or more of silicon dioxide, aluminium oxide or titanium dioxide.

14. A head-mounted display, a head-up display, a helmet-mounted display or a projection display comprising the waveguide in which a dielectric layer is formed as in claim 1.

15. A head-mounted display, a head-up display, a helmet-mounted display or a projection display comprising the waveguide of claim 1.

* * * * *